United States Patent [19]

D'Angelo et al.

[11] Patent Number: 5,800,127
[45] Date of Patent: Sep. 1, 1998

[54] METHOD OF BALANCING FAN ROTORS, PARTICULARLY ELECTRIC FANS FOR USE IN MOTOR VEHICLES

[75] Inventors: Sergio D'Angelo, Vasto; Marco Greco, Pescara, both of Italy

[73] Assignee: Industrie Magneti Marelli S.p.A., Milan, Italy

[21] Appl. No.: 777,376

[22] Filed: Dec. 27, 1996

[30] Foreign Application Priority Data

Dec. 28, 1995 [IT] Italy .................. TO95A1053

[51] Int. Cl.$^6$ .................................................. F04D 29/00
[52] U.S. Cl. .................................................. 416/144
[58] Field of Search ................................... 416/144

[56] References Cited

U.S. PATENT DOCUMENTS 3,315,750  4/1967  Delaney ........................ 416/144
3,687,244  8/1972  Hillagass et al. ............... 416/144
4,776,763  10/1988  Light ............................. 416/144
5,470,203  11/1995  Mori et al. ..................... 416/144
5,591,008  1/1997  Wrobel et al. ................. 416/144

FOREIGN PATENT DOCUMENTS 2655400  6/1991  France .
2629428  1/1978  Germany .
9102865  7/1992  Germany .
9303469  7/1994  Germany .
36606  3/1979  Japan ............................. 416/144

*Primary Examiner*—John T. Kwon
*Attorney, Agent, or Firm*—Sughrue, Mion, Zinn, Macpeak & Seas, PLLC

[57] ABSTRACT

The method enables a fan rotor to be balanced by the addition of material in at least one selected position on the fan rotor. It is characterized in that the material is added by the application of one or more metal staples.

2 Claims, 1 Drawing Sheet

METHOD OF BALANCING FAN ROTORS, PARTICULARLY ELECTRIC FANS FOR USE IN MOTOR VEHICLES

BACKGROUND OF THE INVENTION

The present invention relates to a method of balancing fan rotors by the addition of material in at least one selected position.

Fan rotors with blades are widely used particularly in electric fans for use in motor vehicles.

SUMMARY OF THE INVENTION

The object of the present invention is to provide a method which makes the balancing of fan rotors, particularly plastics fan rotors, extremely quick, reliable and stable over time.

This object is achieved, according to the invention, by a method of balancing fan rotors, characterized in that balancing material is added by the application of one or more metal staples.

The method according to the invention provides for the use of metal staples of the type generally used for stapling sheets of paper.

These metal staples which, before application, are typically C-shaped, are applied by means of known devices (staple pliers) which can cause the end arms of a metal staple to penetrate through (for example) a blade, and can close the arms by deformation onto the opposite surface or face of the blade to that from which the staple is applied.

The method according to the invention is distinguished by being extremely easy, quick and cheap to implement. The balancing thus achieved is highly reliable and stable since the metal staples applied remain firmly in the position of application, ensuring that the balancing is maintained over time.

BRIEF DESCRIPTION OF THE DRAWINGS

Further characteristics and advantages of the invention will become clear from the following detailed description, given purely by way of non-limiting example, with reference to the appended drawings, in which.

DETAILED DESCRIPTION OF THE INVENTION

Figure 1:
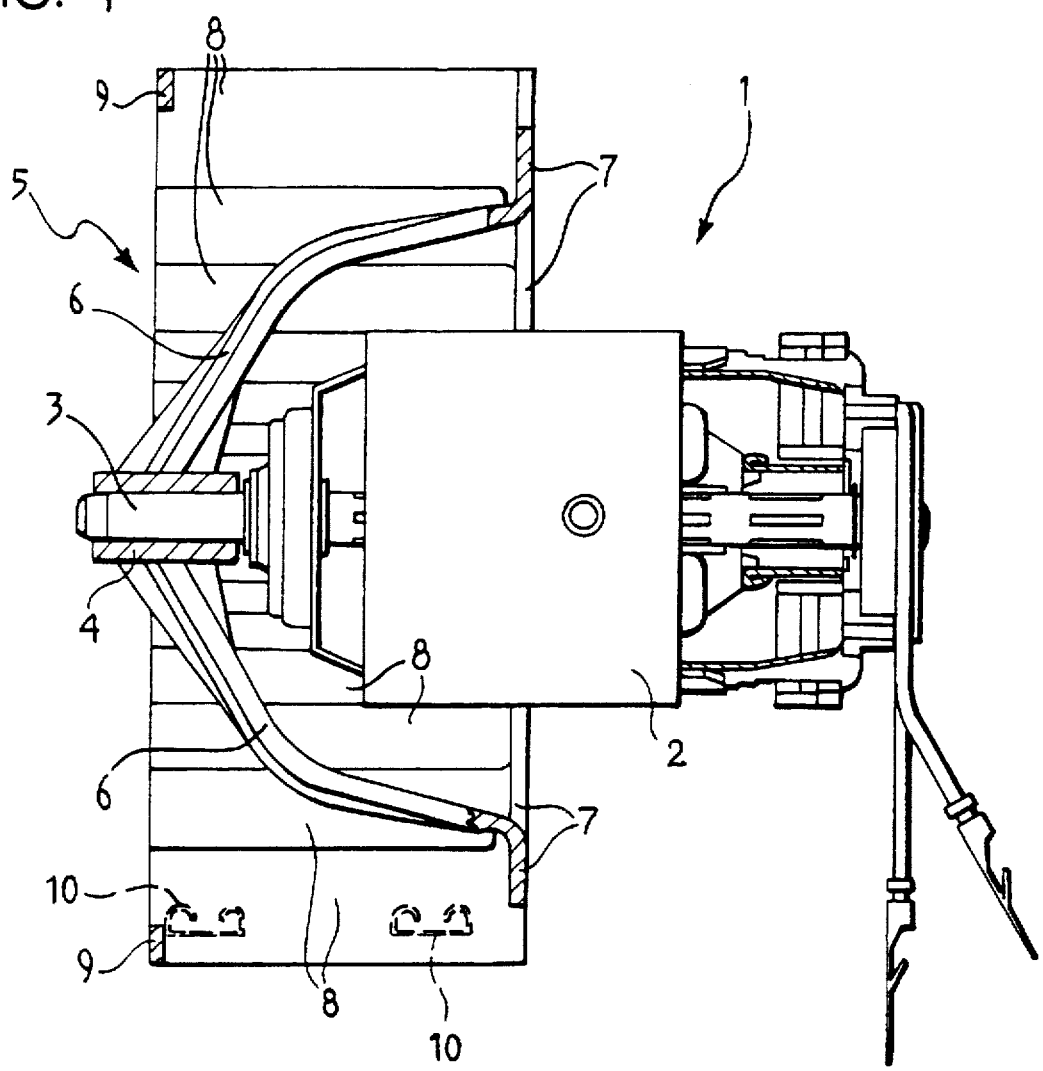
FIG. 1 is a partially-sectioned side view of a motor-driven fan balanced by the method according to the Invention.

An electric fan, generally indicated 1 in FIG. 1, comprises, in known manner, an electric drive motor 2 having a rotatable shaft 3 on which the hub 4 of a fan rotor, generally indicated 5, is keyed.

In the embodiment shown by way of example, the fan rotor 5 is of the centrifugal type and comprises a plurality of spokes 6 which extend from the hub 4 and are connected at their ends by a ring, indicated 7.

The fan rotor 5 also comprises an annular array of blades 8 which extend essentially parallel to the axis of the fan rotor between the rear ring 7 and a front ring 9.

The fan rotor 5 is advantageously formed integrally as a single piece of moulded plastics material.

The fan rotor is balanced by the selective addition of material which, according to the invention, is achieved by the application of one or more metal staples 10 to at least one blade.

Figure 2:
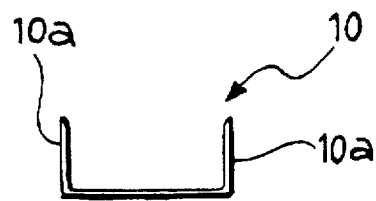
FIGS. 2 and 3 show, by way of example, a metal staple used for balancing, before and after application to the fan rotor, respectively.
Figure 3:
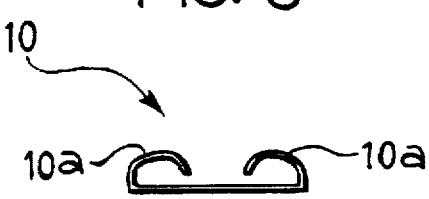

As stated above, these metal staples are of the absolutely conventional type shown in FIGS. 2 and 3.

FIG. 2 shows, in particular, a metal staple of this type in the condition before its application. The metal staple 10 is substantially C-shaped with two end arms 10a which can be made to penetrate through the thickness of a blade 8 of the fan rotor.

After they have penetrated through a blade, the end arms 10a of the metal staple 10 are closed onto the opposite face of the blade and adopt the configuration shown in FIGS. 1 and 3.

The application of the metal staples 10 in order to balance the fan can be carried out automatically in an equipment including a conventional stapler.

Naturally, the principle of the invention remaining the same, the forms of embodiment and details of construction may be varied widely with respect to those described and illustrated purely by way of non-limiting example, without thereby departing from the scope of the present invention as defined in the annexed Claims.

What is claimed is:

1. A fan rotor for use with a motor comprising a rotor having a plurality of blades of plastic material secured thereto and at least one staple secured to one of said blades for balancing said rotor, said staple having a C-shaped configuration with a pair of end arms penetrated through the plastic material of the blade with the legs bent into engagement with the blade.

2. A method for balancing a fan rotor having a plurality of blades of plastic material comprising securing at least one C-shaped staple having two end arms to a fan blade in a desired location including penetrating the end arms of the staple through the plastic material of the blade and bending the arms into engagement with the fan blade to secure the staple to the blade.

* * * * *